Jan. 12, 1926.

M. A. FEIDER

LINING JIG

Filed March 15, 1923

1,569,119

Mathias A. Feider, Inventor

By Franks Addleman, Attorney

Patented Jan. 12, 1926.

1,569,119

UNITED STATES PATENT OFFICE.

MATHIAS A. FEIDER, OF MADISON, INDIANA.

LINING JIG.

Application filed March 15, 1923. Serial No. 625,395.

*To all whom it may concern:*

Be it known that I, MATHIAS A. FEIDER, a citizen of the United States of America, and resident of Madison, in the county of Jefferson and State of Indiana, have invented certain new and useful Improvements in Lining Jigs, of which the following is a specification.

This invention relates to lining jigs and particularly to a device intended for use in testing the condition of engine connecting rods and determining whether the same are straight.

It is an object of this invention to produce a jig of the character indicated having a suitable base with adjustable indicators and an adjustable support for an element which answers the purpose of a wrist pin in order that the connecting rod may be oscillatably supported in operative relation to the gages or indicators by which the condition of the connecting rod may be determined.

It is a further object of this invention to provide yieldable gages in order that an operator may judge the degree of distortion that exists in a connecting rod when it is out of alinement.

A still further object of this invention is to provide a device of the character indicated which can be accurately employed in connection with connecting rods of different lengths and by means that are readily adjustable to adapt it for use with rods of different lengths.

With the foregoing and other objects in view, the invention consists in the details of construction and in the arrangement and combination of parts to be hereinafter more fuly set forth and claimed.

In describing the invention in detail, reference will be had to the accompanying drawings forming part of this application wherein like characters denote corresponding parts in the several views, and in which—

Figure 1:
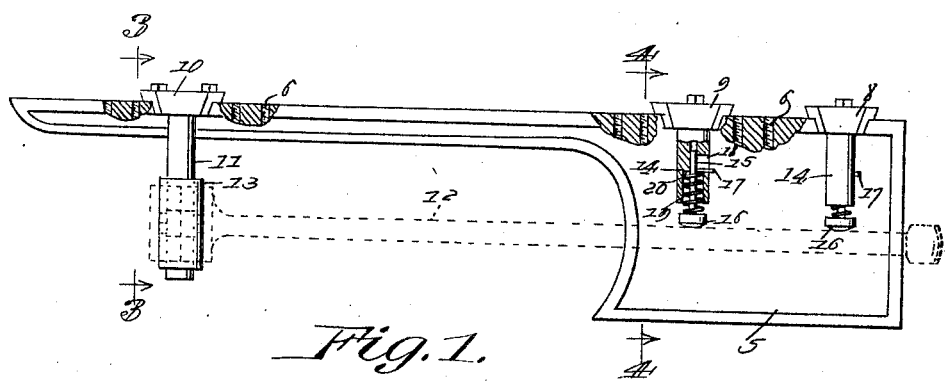
Figure 1 illustrates a plan view of a jig embodying the invention, the same being partly in section.
Figure 2:
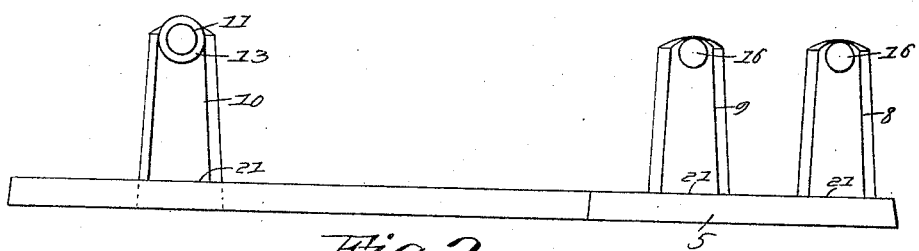
Figure 2 illustrates a side elevation thereof.
Figure 3:
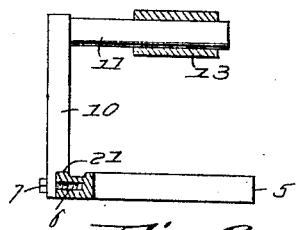
Figure 3 illustrates a sectional view on the line 3—3 of Figure 1.
Figure 4:
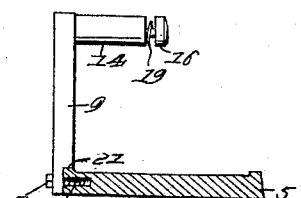
Figure 4 illustrates a sectional view on the line 4—4 of Figure 1.

In these drawings 5 denotes a base having a plurality of apertures 6 in one of its edges, the said apertures being preferably threaded to engage the threads of anchoring screws such as 7 that are employed for securing the posts of brackets 8, 9 and 10 in different positions of adjustment. The post 10 is preferably held in place by two screws as a greater amount of strain is occasioned to the bracket 10 owing to the fact that it supports the connecting rod while it is being manipulated. The bracket 10 has a wrist pin 11 on which a connecting rod 12 may be oscillatably mounted and in order that the wrist pin may be used practically regardless of the wrist pin socket of the connecting rod, bushings 13 may be employed, the bores of the bushings being equal to the diameter of the wrist pin 11 whereas the external diameter of the wrist pins may be different in order that they will fit connecting rods with sockets of different sizes.

As shown in Figure 1, a connecting rod is illustrated in dotted lines in operative relation to the wrist pin and bushing and in operative relation to the gages to be presently described.

The posts or brackets 8 or 9 may be stationed close together or far apart within predetermined bounds and as the bracket 10 is also adjustable, it will be apparent that provision is made for operating on connecting rods of different lengths.

Each gage comprises, in the present embodiment of the invention, a tubular arm 14 in which a shank 15 is slidable, each of said shanks having a head or abutment 16 which may contact with the connecting rod when the connecting rod is straight. Should the connecting rod be crooked, it would not strike both of the heads simultaneously and the degree of distortion could be determimed by observing the position of the connecting rod with relation to the said heads, or by noting the relative position of pins 17.

The shank 15 has a pin 17 which projects laterally through the slot 18 in the arm and by this means the axial movement of the shank is limited. A spring 19 encircles each shank between the head and a shoulder 20 formed in the arm, and the spring operates to hold the shank normally projected, it being apparent that the heads of the two arms will be normally in alinement or parallel with the edge of the base to which the posts 8 and 9 are attached and that the pins serve to limit the outward movement of the shanks.

The joint between the posts and the base as illustrated at 21 is such as to prevent oscillation of the post with relation to the base even though but one anchoring screw is employed.

The device illustrated is used to test connecting rods and to ascertain if they are straight or not deformed, and in use the pins 17 are slidable in the slots 18 serve as gage pins and are moved toward the longer straight edge of base 5 when engaged by the connecting rod 12.

As connecting rods for automobile engines vary in length and have heads of different diameters, the pin 11 will carry bushings to fit the bore through said heads, and it will be noted that the longer edge of the base is provided with a plurality of internally threaded apertures 6 to provide means for adjusting the standards or posts 8, 9 and 10 to suit the requirements of the work.

I claim:

1. In a lining jig, a base, posts, means for adjustably connecting the posts to the base, a wrist pin on one of the posts for oscillatably supporting a connecting rod, arms in parallel position with relation to each other projecting from the other posts, and pressure yieldable elements projecting from the said arms, the member which is to be gaged being held so as to be swung in engagement with said yielding elements.

2. In a lining jig, a base having in its longer edge a plurality of internally threaded apertures in its edge, posts having screws extending therethrough and threaded in the apertures for holding the posts at different positions of adjustment with relation to the base, a wrist pin on one of the posts for oscillatably supporting a connecting rod, hollow arms projecting from the other posts parallel to each other, shanks oscillatable in the parallel arms and projecting from the ends thereof, means for limiting the outward movement of the shanks, and means for yieldably holding the shanks normally projected.

MATHIAS A. FEIDER.